T. E. MURRAY.
VEHICLE WHEEL.
APPLICATION FILED SEPT. 27, 1915.

1,177,259.  Patented Mar. 28, 1916.

Inventor
Thomas E. Murray
By his Attorney
Park Benjamin

UNITED STATES PATENT OFFICE.

THOMAS E. MURRAY, OF NEW YORK, N. Y.

VEHICLE-WHEEL.

1,177,259.  Specification of Letters Patent.  Patented Mar. 28, 1916.

Application filed September 27, 1915. Serial No. 52,797.

*To all whom it may concern:*

Be it known that I, THOMAS E. MURRAY, a citizen of the United States, residing at New York, in the county of New York and State of New York, have invented a certain new and useful Improvement in Vehicle-Wheels, of which the following is a specification.

The invention relates to vehicle wheels of metal, and more especially to a demountable rim therefor.

The invention has for its object to simplify the construction, to facilitate the removal and substitution of the rim, and to enable said rim to be both clamped and tightened in place on the fixed rim, by one and the same operation.

A fixed rim, preferably homogeneously united to the metal spokes at their butt ends, has an outwardly turned edge on one side to receive the usual tire-holding rim, and at the other side is inwardly flanged, the flange bearing against the spokes, and, if desired, being welded to them. A number of wedge-shaped clamping members are pivoted to the flange, preferably at points between the spokes. Each member at one end has a concave projection which engages the side of the movable rim opposite to that received in the concavity of the fixed rim, and at its other end is beveled to coact with an inclined portion of said flange. The pivot bolt of each member is headed, extends through flange and member, and is provided with a nut. When the nut is set up, the member acts as a wedge coöperating with both flange and rim, and forcing the rim outwardly to tighten the same, while also at the same time clamping the movable rim upon the fixed rim. When it is desired to remove the rim, the nuts are loosened sufficiently to permit the several members to be rotated on their pivots out of engagement with the rim, when said rim may be easily slid off of the fixed rim.

Figure 1:
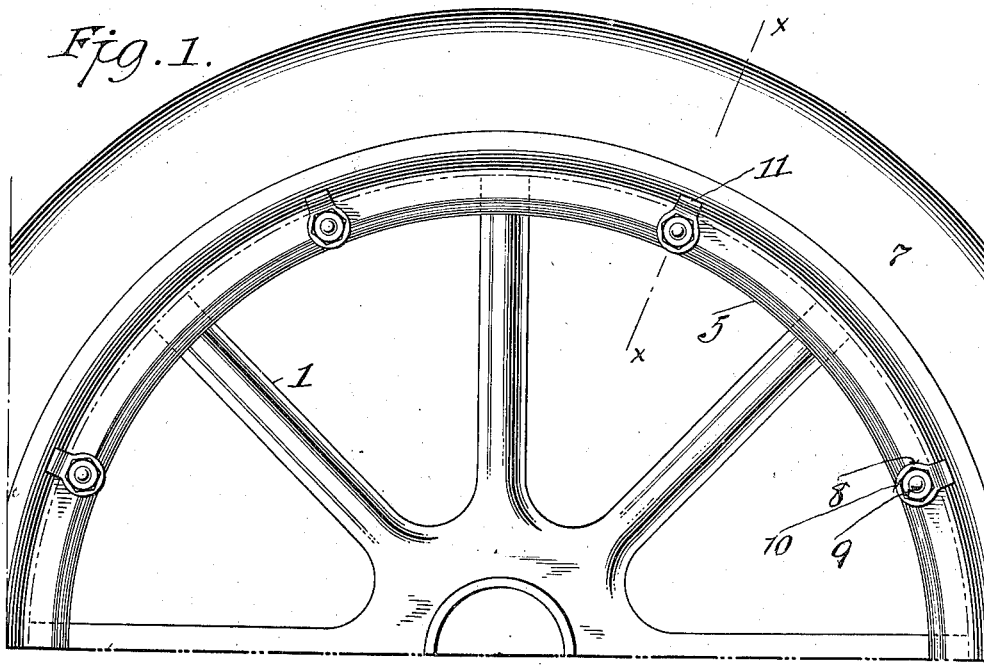
Figure 2:
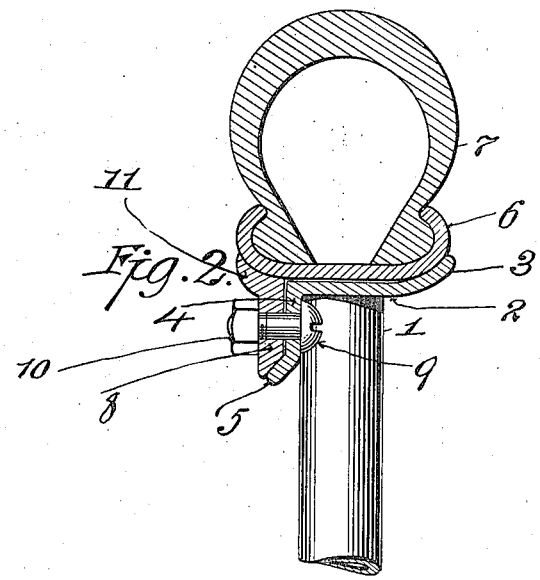

In the accompanying drawings, Figure 1 is a face elevation of a portion of the wheel. Fig. 2 is a section on the line $x$, $x$ of Fig. 1.

Similar numbers of reference indicate like parts.

The body portion of the wheel is of metal, and has tubular spokes 1, to the ends of which the fixed rim 2 is preferably homogeneously united by electric welding. One edge 3, of the fixed rim is turned outward. On the opposite side is a flange 4 which bears against the spokes, and which may be welded thereto. The inner edge 5 of the flange is inclined outwardly at an obtuse angle with respect to the remainder of said flange. The movable rim 6, suitably formed to receive the tire shoe 7, is seated on the fixed rim 2, one side of the movable rim being received in the concavity formed by the outwardly turned edge 3 of said fixed rim. Substantially wedge-shaped clamping members 8 are pivoted to the flange 4, preferably at points between and equidistant from the spokes, by means of headed bolts 9 which pass through said flange and said members, and are threaded to receive nuts 10. The inner end of each member 8 is beveled to bear against the inclined portion 5 of the surface of flange 4. A projection 11 on the outer end of each member 8 is made concave to bear against the convex side of the movable rim 6. Each member 8 is, therefore, substantially a wedge—one face of which is the beveled end coöperating with the portion 5 of fixed rim flange 4, and the other face of which is the concavity of projection 11 coöperating with the rim 6. Hence when the nut 10 is set up, the member is forced between movable rim and fixed rim flange, and so coöperating with both, acts to tighten the movable rim. At the same time the movable rim becomes clamped between the outwardly turned edge 3 of the fixed rim and the projections 11 of the several clamping members 8.

When it is desired to dismount the rim 6, the nut 10 is loosened and moved outwardly on its bolt, thus permitting the members 8 to be moved in the same direction and so withdrawn from contact with rim and flange sufficiently to enable them to be rotated on said bolts to bring their projections 11 out of engagement with the rim. The rim 6 can then be slid laterally off of the fixed rim, and, if desired, another shoe-carrying rim may be substituted, the members 8 then being turned back into engaging position and the nuts set up as before to clamp and tighten the rim by a single operation of said members.

I claim:

1. A vehicle wheel, comprising a single fixed rim having one edge outwardly turned, a movable rim seated in the concavity of said fixed rim, an inwardly turned flange on the opposite edge of said fixed rim, the outer face of said flange forming with said movable rim an annular seat of substantially frusto-wedge shaped cross section, a plurality of clamping members of corresponding cross section, and means for moving said members into said seat to clamp said movable rim on said fixed rim.

2. A vehicle wheel, comprising a single fixed rim having one edge outwardly turned, an inwardly turned flange on the opposite side of said fixed rim having a portion of its surface inclined at an obtuse angle to the remaining portion, a demountable rim seated on said fixed rim, a plurality of movable clamping members mounted on said flange, each of said members having a flat middle portion and at one end thereof a concave projection receiving said rim and having at its opposite end an inclined portion to coöperate with the inclined surface of said flange, and means for moving said members to clamp said rim between said projections and said fixed rim.

3. A vehicle wheel, comprising a single fixed rim having one edge outwardly curved, an inwardly turned flange on the opposite edge, the outer face of said flange having a flat portion and a portion inclined at an obtuse angle to said flat portion, a plurality of clamping members, each having at its outer end a projection provided with a concavity corresponding in shape to the curved portion of said rim, a flat portion corresponding to the flat portion of said flange, and an inclined portion corresponding to the inclined portion of said flange, headed bolts extending through said flat portion of said flange and said clamping members and threaded at their outer portions to receive nuts, and a removable rim seated in the concavity of said fixed rim and engaged on opposite edges by said curved portion of said fixed rim and said clamping members.

In testimony whereof I have affixed my signature in presence of two witnesses.

THOMAS E. MURRAY.

Witnesses:
GERTRUDE T. PORTER,
MAY T. MCGARRY.